(12) United States Patent
Furuno

(10) Patent No.: US 9,810,259 B2
(45) Date of Patent: Nov. 7, 2017

(54) THRUST BEARING
(71) Applicant: IHI Corporation, Tokyo (JP)
(72) Inventor: Akihisa Furuno, Tokyo (JP)
(73) Assignee: IHI CORPORATION, Tokyo (JP)
( * ) Notice: Subject to any disclaimer, the term of this patent is extended or adjusted under 35 U.S.C. 154(b) by 419 days.
(21) Appl. No.: 14/686,108
(22) Filed: Apr. 14, 2015

(65) Prior Publication Data
US 2015/0219147 A1    Aug. 6, 2015

Related U.S. Application Data
(63) Continuation of application No. PCT/JP2013/078070, filed on Oct. 16, 2013.

(30) Foreign Application Priority Data
Oct. 16, 2012    (JP) .................................. 2012-228892

(51) Int. Cl.
  *F16C 17/04*    (2006.01)
(52) U.S. Cl.
  CPC .......... *F16C 17/042* (2013.01); *F16C 17/047* (2013.01)
(58) Field of Classification Search
  CPC ............................. F16C 17/042; F16C 17/047
  See application file for complete search history.

(56) References Cited
U.S. PATENT DOCUMENTS 1,786,565 A * 12/1930 Freeman ............. F16C 33/1075
  384/368
2,899,243 A *  8/1959 Acterman ............... F16C 17/08
  384/121
4,082,375 A *  4/1978 Fortmann ............. F16C 17/042
  384/105
4,597,677 A     7/1986 Hagiwara
  (Continued)

FOREIGN PATENT DOCUMENTS

CN          201373019 Y    12/2009
JP          S59-187111 A   10/1984
  (Continued)

OTHER PUBLICATIONS

Japan Patent Office, "Notice of Reasons for Rejection", issued in Japanese Patent Application No. 2014-542159 which is a JP counterpart of U.S. Appl. No. 14/686,108, dated Oct. 27, 2015, 6 pages (3 pages of English Translation and 3 pages of Notice of Reasons for Rejection).

(Continued)

*Primary Examiner* — Phillip A Johnson

(57) ABSTRACT

A thrust bearing includes: a top foil formed of top foil pieces which face a thrust collar; a back foil formed of back foil pieces which support the top foil pieces; and a base plate including support areas which support the back foil pieces. A support area includes an inclined surface defined by a first boundary line and by a second boundary line disposed on a trailing side of the first boundary line in the rotational direction of the thrust collar. The height of the inclined surface gradually increases from the first boundary line to the second boundary line. In addition, a back foil piece is disposed within the inclined surface which is formed continuously from the first boundary line to the second boundary line.

7 Claims, 6 Drawing Sheets

(56) References Cited

U.S. PATENT DOCUMENTS

| | | | | | |
|---|---|---|---|---|---|
| 4,654,939 | A | * | 4/1987 | Silver | F16C 17/024 |
| | | | | | 29/898.02 |
| 5,110,220 | A | * | 5/1992 | Gu | F16C 17/042 |
| | | | | | 384/103 |
| 5,318,366 | A | * | 6/1994 | Nadjafi | F16C 27/02 |
| | | | | | 384/105 |

FOREIGN PATENT DOCUMENTS

| | | |
|---|---|---|
| JP | S60-185720 U | 12/1985 |
| JP | S61-092316 A | 5/1986 |
| JP | S63-195412 A | 8/1988 |
| JP | 2002-349551 A | 12/2002 |
| JP | 2003-507682 A | 2/2003 |
| JP | 2003-148461 A | 5/2003 |
| JP | 2004-270904 A | 9/2004 |
| JP | 2006-057652 A | 3/2006 |
| JP | 2008-501922 A | 1/2008 |
| JP | 2008-513701 A | 5/2008 |
| JP | 2009-299748 A | 12/2009 |
| WO | 01/14755 A1 | 3/2001 |
| WO | 2005/121576 A1 | 12/2005 |
| WO | 2006/036570 A2 | 4/2006 |

OTHER PUBLICATIONS

International Search Report received for PCT Patent Application No. PCT/JP2013/078070 dated Nov. 26, 2013, which is a parent application of the present application; 4 pages (2 pages of English Translation and 2 pages of original search report).

* cited by examiner

US 9,810,259 B2

THRUST BEARING

This application is a Continuation Application based on International Application No. PCT/JP2013/078070, filed Oct. 16, 2013, which claims priority on Japanese Patent Application No. 2012-228892, filed Oct. 16, 2012, the contents of both of which are incorporated herein by reference.

TECHNICAL FIELD

The present invention relates to a thrust bearing.

BACKGROUND ART

In the related art, as a bearing used for a high-speed rotating body, a thrust bearing is known which is disposed so as to face a thrust collar provided on a rotary shaft. As such a thrust bearing, a foil-type thrust bearing is well known. The foil-type thrust bearing is configured so that wave sheets formed of thin sheets called bump foils are annularly arranged on an annular plate-shaped plate member (base plate) which is a base, and thin sheets called top foils, whose number is the same as the number of the bump foils, are disposed on the bump foils (refer to Patent Documents 1 and 2).

When the foil-type thrust bearing having the above configuration rotates in a state where the thrust collar is close to the thrust bearing surface (top foil), an air film (fluid lubrication film) is formed between the thrust collar and the top foil through the wedge effect, and the foil-type thrust bearing supports the thrust collar through the air film. The wedge effect is a phenomenon in which when a fluid flows from a wide gap into a narrow gap, pressure occurs in the narrow gap. The thrust bearing supports a load (the thrust collar) using this effect, namely using the pressure occurring in the narrow gap.

Therefore, in order to efficiently obtain the wedge effect in the foil-type thrust bearing, it is necessary to change the height of the top foil in the rotational direction of the thrust collar in order that the wide gap and the narrow gap are continuously formed between the thrust collar and the top foil. In order to change the height of the top foil in this way, in the related art, the height of the bump foil (the heights of bumps (peaks)) is changed in the rotational direction of the thrust collar.

In addition, Patent Documents 3 to 6 disclose thrust bearings supporting thrust collars.

DOCUMENT OF RELATED ART

Patent Document

[Patent Document 1] Published Japanese Translation No. 2008-513701 of PCT International Publication WO 2006/036570 A2

[Patent Document 2] Published Japanese Translation No. 2008-501922 of PCT International Publication WO 2005/121576 A1

[Patent Document 3] Japanese Unexamined Patent Application, First Publication No. S61-92316

[Patent Document 4] Japanese Unexamined Patent Application, First Publication No. 2002-349551

[Patent Document 5] Japanese Unexamined Patent Application, First Publication No. S63-195412

[Patent Document 6] Japanese Unexamined Patent Application, First Publication No. S59-187111

SUMMARY OF INVENTION

Technical Problem

However, since the bump foil is formed of a thin sheet having a thickness of about 0.1 mm, it is difficult to perform a machining in which the height of each peak is changed, for example, several tens of micrometers. Even if the machining can be performed, the machining cost thereof may be greatly increased. Furthermore, since the machining accuracy deteriorates, it is difficult to accurately change the height of the top foil in accordance with the design thereof In addition, it is conceivable that the height of the top foil is changed by gradually changing the compressed amounts of peaks of the bump foil using the pressing force of the top foil which is disposed on the bump foil, without changing the heights of peaks of the bump foil. However, even in this case, it is very difficult to accurately change the height of the top foil in accordance with the design thereof.

If the height of the top foil cannot be accurately changed in this way, the mass productivity deteriorates, and thus the manufacturing cost thereof increases. In addition, since it becomes difficult to design the bearing load capability beforehand, it may be difficult to evaluate the performance of the bearing, and the utility thereof may deteriorate.

The present invention has been made in view of the above circumstances, and an object thereof is to provide an excellent thrust bearing in which the height of the top foil can be accurately changed and thereby the bearing load capability can be designed beforehand.

Solution to Problem

A first aspect of the present invention is a thrust bearing disposed so as to face a thrust collar provided on a rotary shaft, the thrust bearing including: a top foil disposed so as to face the thrust collar; a back foil disposed so as to face a surface of the top foil opposite to another surface of the top foil facing the thrust collar, and supporting the top foil; and an annular plate-shaped base plate disposed on a side of the back foil opposite to the top foil, and supporting the back foil. The back foil is formed of back foil pieces arranged in a circumferential direction of the base plate. The top foil is formed of top foil pieces disposed on the back foil pieces. The base plate includes support areas which support the back foil pieces and which are arranged in the circumferential direction. A support area includes an inclined surface defined by a first boundary line and by a second boundary line disposed on a trailing side of the first boundary line in a rotational direction of the thrust collar. The inclined surface has a height which gradually increases from the first boundary line to the second boundary line. The inclined surface is formed continuously from the first boundary line to the second boundary line. In addition, a back foil piece is disposed within the inclined surface.

According to the first aspect of the present invention, the inclined surface is formed in each support area of the base plate supporting the back foil piece, and has a height which gradually increases from the first boundary line to the second boundary line. The top foil piece is disposed on the inclined surface through the back foil piece, whereby the height of the top foil piece can be accurately changed along the inclined surface. Additionally, in this case, with respect to the back foil piece, it is sufficient that the back foil piece is manufactured having a constant height without changing the height of the back foil piece, and thus the machining cost thereof can be limited.

A second aspect of the present invention is that in the first aspect, the second boundary line is formed in a radial direction of the base plate. In addition, the inclined surface is inclined in a direction orthogonal to the second boundary line.

According to the second aspect of the present invention, the machining of the inclined surface can be easily performed, and the machining of the back foil piece can also be easily performed in accordance with the inclined surface.

A third aspect of the present invention is that in the first or second aspect, an edge portion on a trailing side of a top foil piece in the rotational direction of the thrust collar is formed having a constant height.

According to the third aspect of the present invention, the pressure generated through the wedge effect can be further increased, and thus the bearing load capability of the thrust bearing can be further improved.

A fourth aspect of the present invention is that in any one of the first to third aspects, an edge portion on a leading side of a top foil piece in the rotational direction of the thrust collar is fixed to the base plate.

According to the fourth aspect of the present invention, since the edge portion on the trailing side of the top foil piece in the rotational direction of the thrust collar is in a state of being separated from the base plate via the back foil, the gap between the edge portion and the thrust collar becomes narrow, and thus the preferable wedge effect can be obtained.

A fifth aspect of the present invention is that in any one of the first to fourth aspects, the back foil piece is formed in a wave sheet shape in which peak portions and valley portions are alternately arranged.

According to the fifth aspect of the present invention, the back foil piece can resiliently support the top foil piece.

A sixth aspect of the present invention is that in the fifth aspect, the back foil piece is disposed so that the arrangement direction of the peak portions is the same as the inclination direction of the inclined surface.

According to the sixth aspect of the present invention, if the heights of the peak portions of the back foil piece are formed to be the same, the height of the top foil piece can be changed in accordance with the inclined surface of the base plate. Thus, the machining of the back foil piece can become easy.

A seventh aspect of the present invention is that in the sixth aspect, an edge portion on a trailing side of the back foil piece in the rotational direction of the thrust collar is fixed to the base plate.

According to the seventh aspect of the present invention, the back foil piece can be fixed to the base plate through, for example, welding in the formation direction of the valley portion of the back foil piece, and the fixing of the back foil piece can be easily performed.

Effects of Invention

According to a thrust bearing of the present invention, the inclined surface is formed in each support area of the base plate, and the top foil piece is disposed on the inclined surface through the back foil piece, whereby the height of the top foil piece is accurately changed along the inclined surface. Therefore, the machining of the thrust bearing becomes easy, the mass productivity of the thrust bearing is improved, and a reduction of the manufacturing cost thereof can be achieved. In addition, the bearing load capability of the thrust bearing can be accurately designed beforehand.

DESCRIPTION OF EMBODIMENTS

Figure 1:
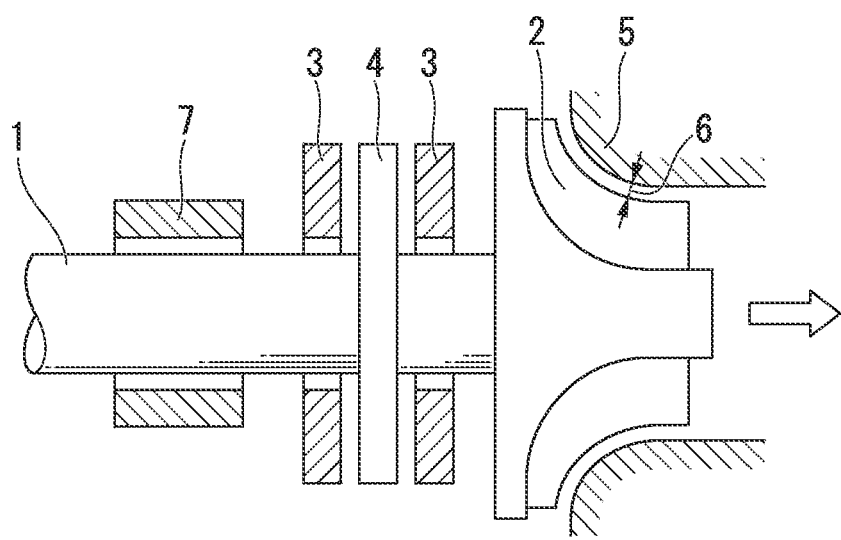
FIG. 1 is a schematic view showing an example of a turbo machine in which a thrust bearing of the present invention is provided.

Hereinafter, thrust bearings of the present invention are described in detail with reference to the drawings. In the following drawings, the scale of each member is appropriately changed in order to show each member in a recognizable size. In this specification and in the drawings, components having substantially the same function and structure are represented by the same reference sign, and duplicate descriptions thereof are omitted. In addition, illustrations of components not directly relating to the present invention are omitted.

(First Embodiment)

FIG. 1 is a side view schematically showing an example of a turbo machine in which a thrust bearing of the present invention is provided. In FIG. 1, a reference sign 1 represents a rotary shaft, a reference sign 2 represents an impeller which is provided in the tip portion of the rotary shaft, and a reference sign 3 represents thrust bearings of the present invention.

A thrust collar 4 is fixed to the rotary shaft 1 near the position at which the impeller 2 is formed. A pair of thrust bearings 3 are disposed, one on each side of the thrust collar 4.

The impeller 2 is disposed inside a housing 5 which is a stationary member, and a tip clearance 6 is formed between the impeller 2 and the housing 5.

A radial bearing 7 is provided on the rotary shaft 1 at a position nearer the center of the rotary shaft 1 than the thrust collar 4.

Figure 2A:
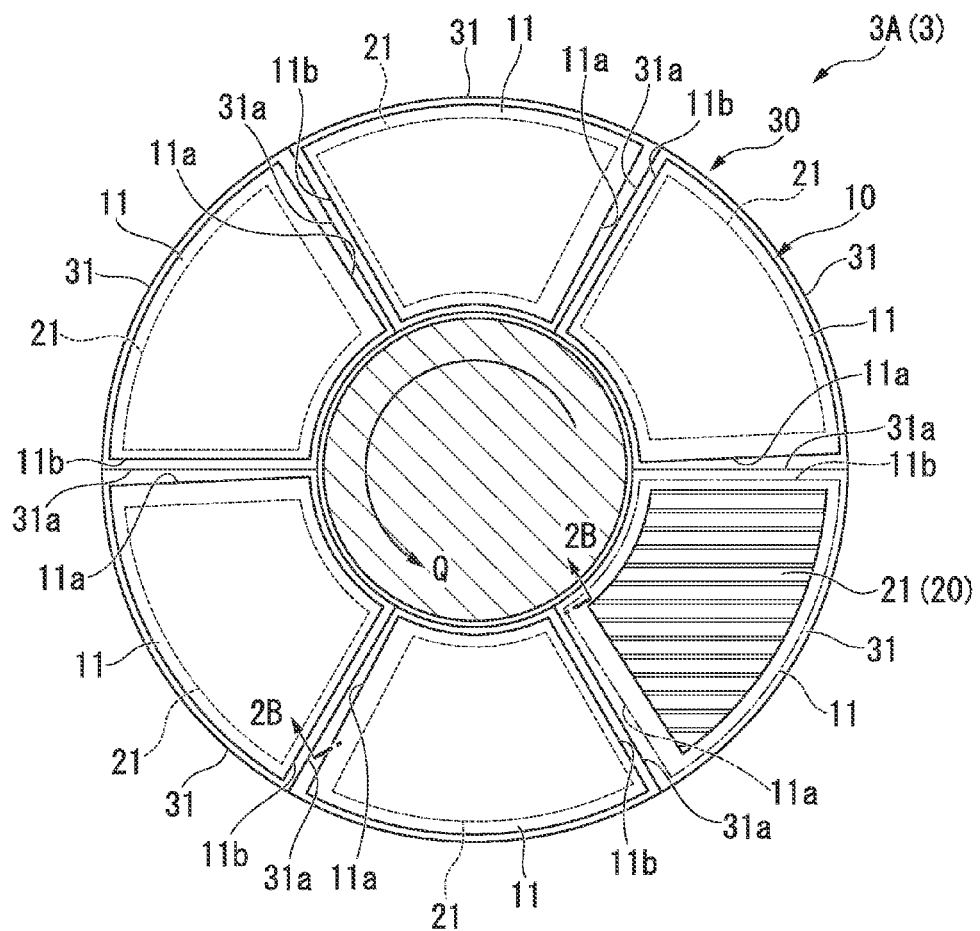
FIG. 2A is a partial cross-sectional plan view showing a thrust bearing of a first embodiment of the present invention.
Figure 2B:
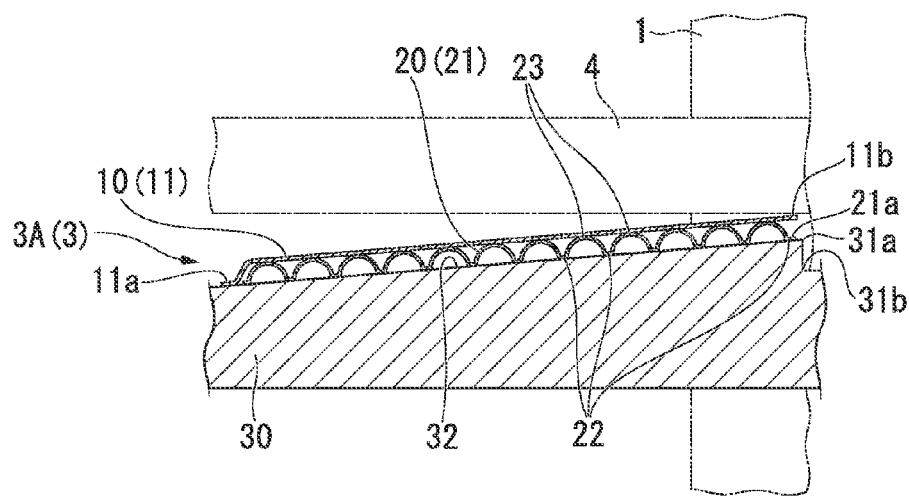
FIG. 2B is a cross-sectional view taken along 2B-2B line in FIG. 2A.
Figure 3A:
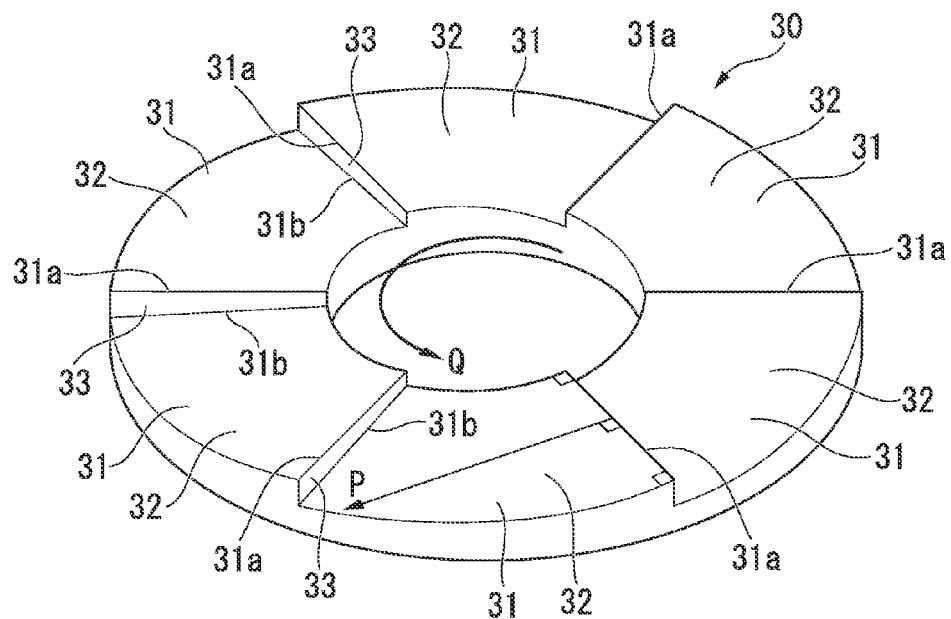
FIG. 3A is a perspective view of a base plate in the thrust bearing of the first embodiment of the present invention.
Figure 3B:
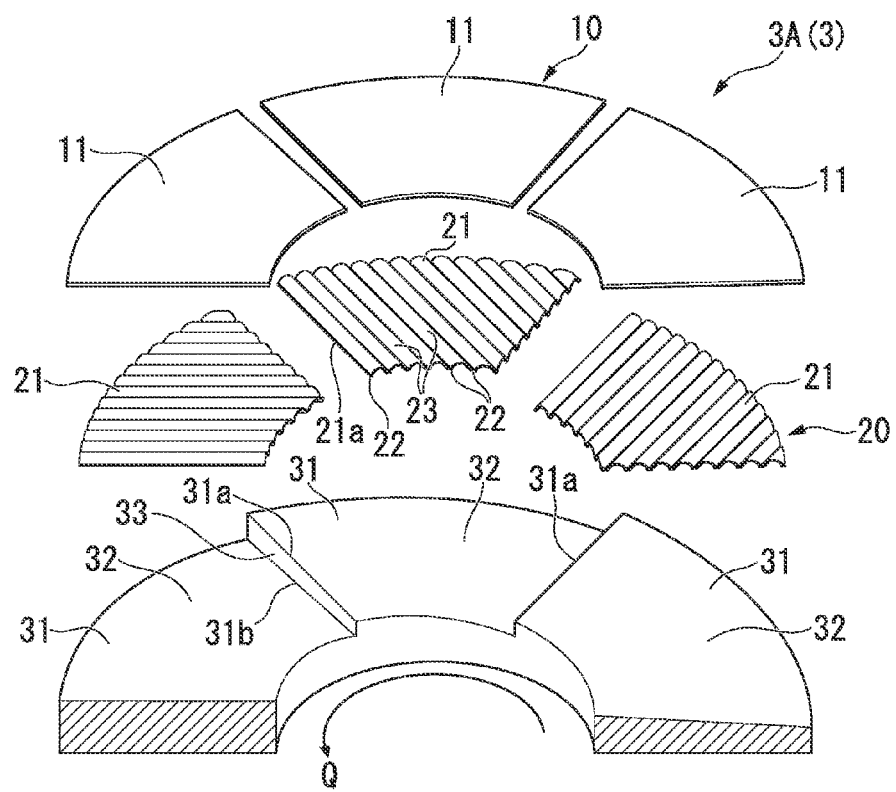
FIG. 3B is an exploded perspective view of a main section of the thrust bearing of the first embodiment of the present invention.

FIGS. 2A, 2B, 3A, and 3B are views showing a thrust bearing 3A(3) of a first embodiment provided in the turbo machine having the above configuration. FIG. 2A is a partial cross-sectional plan view of the thrust bearing 3A(3), and FIG. 2B is a cross-sectional view taken along 2B-2B line in FIG. 2A. FIG. 3A is a perspective view of a base plate, and FIG. 3B is an exploded perspective view of a main section of the thrust bearing 3A(3).

The thrust bearing 3A(3) of the first embodiment is a bearing which is disposed nearer the impeller 2 than the thrust collar 4 in FIG. 1. Additionally, in this embodiment, the thrust bearing 3A(3) which is disposed near the impeller 2 in FIG. 1, and the thrust bearing 3 which is disposed at a position opposite to the thrust bearing 3A(3) across the thrust collar 4 in FIG. 1, namely at a position near the radial bearing 7, include the same components. However, the thrust bearing 3 near the radial bearing 7 has a structure which is a mirror image of the structure of the thrust bearing 3A(3) in the horizontal direction in FIG. 1.

As shown in FIGS. 2A and 2B, the thrust bearing 3A(3) of this embodiment is an annular (cylindrical) bearing which is disposed so as to face the circular plate-shaped thrust collar 4 fixed to the rotary shaft 1, and is provided so as to encircle the rotary shaft 1. As shown in FIGS. 2B and 3B, the thrust bearing 3A includes a top foil 10 disposed so as to face the thrust collar 4, a back foil 20 disposed so as to face the surface of the top foil 10 opposite to the surface of the top foil 10 facing the thrust collar 4, and an annular plate-shaped base plate 30 disposed on the side of the back foil 20 opposite to the top foil 10.

As shown in FIG. 3A, the base plate 30 is an annular plate-shaped metal member. The surface of the base plate 30 facing the thrust collar 4 is provided with support areas which support the back foil 20 and the top foil 10. In this embodiment, as described below, the back foil 20 is formed of a plurality (six) of back foil pieces 21, and the top foil 10 is formed of a plurality (six) of top foil pieces 11. Accordingly, the base plate 30 includes six support areas 31 which are formed by dividing the surface area of the base plate 30 into six areas (into equivalent six areas) in the circumferential direction of the base plate 30 and which are arranged in the circumferential direction. That is, as shown in FIG. 3B, each support area 31 is configured to support a back foil piece 21 and a top foil piece 11. Each support area 31 is formed in an approximately trapezoidal shape in plan view.

As shown in FIGS. 3A and 3B, the whole area of each support area 31 is provided with an inclined surface 32 having a height which increases in the rotational direction of the thrust collar 4 (the rotary shaft 1), and the rotational direction is denoted by the arrow mark Q in FIG. 3A. That is, the height of the inclined surface 32 (the height thereof in the axial direction of the rotary shaft 1) gradually increases in the rotational direction of the thrust collar 4. Additionally, in the present invention, the phrase "the height of the inclined surface increases in the rotational direction" means not only that the height gradually increases in the circumferential direction of the annular plate-shaped base plate 30 but also that the height gradually increases in approximately the same direction as the rotational direction, for example, in a tangential direction of the base plate 30.

In this embodiment, a boundary line 31a positioned between support areas 31 next to each other is formed in the radial direction of the base plate 30. In detail, as shown in FIG. 3A, a boundary surface 33 which is parallel to the axial direction of the rotary shaft 1 is provided between support areas 31 next to each other, and the support areas 31 are connected to each other through the boundary surface 33. The boundary surface 33 of this embodiment is formed to be parallel to the axial direction, but the present invention is not limited to this structure, and the boundary surface 33 may be disposed so that a certain angle is formed between the boundary surface 33 and the axial direction. The edge portion of the boundary surface 33 near the thrust collar 4 is provided with the boundary line 31a (second boundary line) connected to one support area 31, and the other edge portion of the boundary surface 33 opposite to the boundary line 31a is provided with a boundary line 31b (first boundary line) connected to another support area 31. The inclined surface 32 is defined by the boundary lines 31a and 31b. In each support area 31, the boundary line 31a is disposed on the trailing side of the boundary line 31b in the rotational direction of the thrust collar 4 (on the advancing side of the boundary line 31b in the rotational direction).

The boundary line 31a is positioned in a plane perpendicular to the central axis of the rotary shaft 1. That is, the height of the boundary line 31a (the height thereof in the central axis direction) is set to be constant in the longitudinal direction of the boundary line 31a.

The inclined surface 32 is inclined in a direction orthogonal to the boundary line 31a (second boundary line) on the trailing side (on the advancing side) of the support area 31 provided with this inclined surface 32 in the rotational direction of the thrust collar 4. That is, as shown by the arrow mark P in FIG. 3A, the inclined surface 32 is inclined so that the height of the inclined surface 32 gradually decreases in a direction orthogonal to the boundary line 31a, from the boundary line 31a disposed on the trailing side of the inclined surface 32 in the rotational direction Q of the thrust collar 4. Thus, in the portion provided with each boundary line 31a, a step is formed between one and the other of two support areas 31 next to each other. In addition, the arrow mark P direction is the same as the direction parallel to the line connecting the arrow marks 2B shown in FIG. 2A, and thus FIG. 2B is a cross-sectional view taken along the arrow mark P direction and viewed in the orthogonal direction to the arrow mark P direction.

The inclined surface 32 is inclined in a direction orthogonal to the boundary line 31a. Accordingly, when a straight line is imagined which is at any position within the inclined surface 32 and which is parallel to the boundary line 31a, the height of the straight line is constant in the longitudinal direction of the straight line.

The inclined surface 32 is formed so that the height of the inclined surface 32 gradually increases from the boundary line 31b to the boundary line 31a. In addition, the inclined surface 32 is formed continuously from the boundary line 31b to the boundary line 31a, and neither a recessed portion, a projecting portion nor the like, in which the inclination angle thereof suddenly changes, is provided within the inclined surface. The inclined surface 32 of this embodiment is formed having a constant inclination angle in the range from the boundary line 31b to the boundary line 31a. In addition, the inclined surface 32 may be inclined so that the whole inclined surface 32 is slightly curved in a concave shape or in a convex shape in the range from the boundary line 31b to the boundary line 31a when viewed in the radial direction of the base plate 30.

The boundary lines 31a and 31b are formed in radial directions of the base plate 30. In addition, the boundary lines 31a and 31b of this embodiment are positioned on radial lines (or on the vicinity of the radial lines) passing through the center of the base plate 30 (the center of the rotary shaft 1). Accordingly, each support area 31 of this embodiment is formed in an approximately trapezoidal shape in which a pair of radial lines connect an inner circumferential-side arc and an outer circumferential-side arc which is longer than the inner circumferential-side arc. In the connection part between the inner circumferential-side arc and the boundary line 31a in the support area 31, the tangential line of the inner circumferential-side arc and the boundary line 31a are approximately orthogonal to each other. Similarly, in the connection part between the outer circumferential-side arc and the boundary line 31a in the support area 31, the tangential line of the outer circumferential-side arc and the boundary line 31a are approximately orthogonal to each other.

The boundary lines 31a and 31b of this embodiment are positioned on radial lines passing through the center of the base plate 30, but the boundary lines 31a and 31b may be provided at positions separated from the radial lines so as to be parallel to the radial lines. In addition, the boundary line 31b may be disposed so that a certain angle is formed between the boundary line 31b and a radial line passing through the center of the base plate 30.

As shown in FIGS. 2A and 3B, the back foil 20 is formed of six back foil pieces 21 which are arranged in the circumferential direction of the base plate 30. A back foil piece 21 is disposed on each support area 31 of the base plate 30, namely on the inclined surface 32, and thus the back foil pieces 21 are arranged in the circumferential direction of the base plate 30. The back foil piece 21 is disposed within the inclined surface 32. In addition, the back foil piece 21 is formed to be slightly smaller than a top foil piece 11 (described below) in plan view. Therefore, as shown in FIG. 2A, the back foil piece 21 is covered with the top foil piece 11 without being exposed to the thrust collar 4 above the base plate 30.

The back foil 20 composed of the back foil pieces 21 is formed of foils (thin sheets), and resiliently supports the top foil 10 (top foil pieces 11). For such a back foil 20, for example, it is possible to use a bump foil, a sprig foil disclosed in Japanese Unexamined Patent Application, First Publication No. 2006-57652 or in Japanese Unexamined Patent Application, First Publication No. 2004-270904, a back foil disclosed in Japanese Unexamined Patent Application, First Publication No. 2009-299748, or the like. In addition, although the sprig foils disclosed in Japanese Unexamined Patent Application, First Publication No. 2006-57652 and in Japanese Unexamined Patent Application, First Publication No. 2004-270904, and the back foil disclosed in Japanese Unexamined Patent Application, First Publication No. 2009-299748 are foils used for a radial bearing, if the foils are developed in a flat shape and are formed in an annular plate shape, the foils can be used for a thrust bearing.

In this embodiment, as shown in FIGS. 2B and 3B, the back foil 20 is composed of a bump foil, and thus the back foil piece 21 is composed of a bump foil piece. In the back foil piece 21 (bump foil piece), a foil (metal thin sheet) is formed in a wave sheet shape, and as shown in FIG. 2A, the whole back foil piece 21 is formed in an approximately trapezoidal shape which is slightly smaller than the top foil piece 11.

The back foil piece 21 shaped into a wave sheet shape in the above way is formed so that as shown in FIGS. 2B and 3B, valley portions 22 contacting the base plate 30 and peak portions 23 (bumps) contacting the top foil piece 11 are alternately disposed. The valley portions 22 and the peak portions 23 are arranged in the inclination direction of the inclined surface 32 in the support area 31, namely in the inclination direction shown by the arrow mark P in FIG. 3A. That is, the arrangement direction of the valley portions 22 and the peak portions 23 is the same as the inclination direction of the inclined surface 32 (the inclination direction shown by the arrow mark P).

The valley portions 22 and the peak portions 23 are formed at approximately regular intervals in the inclination direction, and the heights of the peak portions 23 are formed to be constant. Thus, the machining thereof is easily performed compared to a structure in the related art in which the heights of peak portions have to be changed.

The back foil piece 21 is fixed to the base plate 30 through spot welding along the edge portion 21a on the trailing side of the back foil piece 21 in the rotational direction of the thrust collar 4, namely along the formation direction of the valley portion 22 which is the edge portion 21a. In this case, as shown in FIG. 3B, the whole edge portion 21a of the back foil piece 21 is formed of one continuous valley portion 22, and therefore the whole valley portion 22 can be easily welded onto the base plate 30. Thus, the fixing of the back foil piece 21 by welding can be easily performed.

The fixing of the edge portion 21a to the base plate 30 can be performed using a general mechanical fixing method other than spot welding, such as screw fixing.

In this embodiment, the edge portion 21a of the back foil piece 21 positioned near the boundary line 31a is fixed to the base plate 30. However, the present invention is not limited to this structure, and the edge portion of the back foil piece 21 positioned near the boundary line 31b may be fixed to the base plate 30.

The back foil piece 21 is formed in a similar shape to the support area 31 or to the inclined surface 32 which is formed in an approximately trapezoidal shape. Accordingly, the back foil piece 21 of this embodiment is formed in an approximately trapezoidal shape in which a pair of radial lines connect an inner circumferential-side arc and an outer circumferential-side arc. In the connection part between the inner circumferential-side arc and the edge portion 21a in the back foil piece 21, the tangential line of the inner circumferential-side arc and the edge portion 21a are approximately orthogonal to each other. Similarly, in the connection part between the outer circumferential-side arc and the edge portion 21a in the back foil piece 21, the tangential line of the outer circumferential-side arc and the edge portion 21a are approximately orthogonal to each other.

As shown in FIGS. 2A and 3B, the top foil 10 is formed of six top foil pieces 11 which are arranged in the circumferential direction of the base plate 30. A top foil piece 11 is formed of a metal thin sheet (foil) into approximately the same shape as the support area 31, namely into an approximately trapezoidal shape in which a portion including an apex is removed from a circular sector and in which the upper base (the inside edge of the trapezoidal shape in the radial direction) and the lower base (the outside edge of the trapezoidal shape in the radial direction) are formed in arcs. A top foil piece 11 formed in this shape is disposed on each support area 31 of the base plate 30 so as to cover a back foil piece 21, and the top foil pieces 11 are arranged at regular intervals in the circumferential direction of the base plate 30 and are disposed in an annular plate shape as a whole, thereby forming the top foil 10.

As shown in FIG. 2A, the top foil piece 11 is formed to be slightly smaller than the support area 31 and is formed to be slightly larger than the back foil piece 21. Therefore, the top foil pieces 11 are disposed without contacting each other. A top foil piece 11 is disposed on each support area 31 so as to cover the top surface of a back foil piece 21 without exposing the back foil piece 21 to the thrust collar 4. However, the present invention is not limited to this structure, and the back foil piece 21 may be formed in the same size as the top foil piece 11, or may be formed to be larger than the top foil piece 11.

The edge portion 11a (leading edge) on the leading side of the top foil piece 11 in the rotational direction of the thrust collar 4 is directly fixed to the base plate 30 through spot welding. Therefore, the edge portion 11a becomes a fixed end. On the other hand, as shown in FIG. 2B, the edge portion 11b (trailing edge) on the trailing side of the top foil piece 11 in the rotational direction of the thrust collar 4 becomes a free end which is merely placed on the peak portions 23 of the back foil piece 21 without being fixed. In addition, the fixing of the edge portion 11a of the top foil piece 11 to the base plate 30 can be performed using a general mechanical fixing method such as screw fixing other than spot welding.

The edge portion 11a of this embodiment is fixed to the vicinity of the boundary line 31b whose height is the least within the inclined surface 32 (refer to FIGS. 2B and 3A). In addition, the present invention is not limited to this structure, and the edge portion 11a of the top foil piece 11 disposed on one inclined surface 32 may be fixed to the vicinity of the boundary line 31a whose height is the greatest within another inclined surface 32 next to the one inclined surface 32.

As shown in FIG. 2A, in this embodiment, the edge portion 11b is disposed to be parallel to the boundary line 31a positioned between support areas 31 next to each other, and thus the edge portion 11b is disposed at a constant height position on the inclined surface 32 of the base plate 30 through the back foil piece 21. In the back foil piece 21, the arrangement direction of the peak portions 23 is the same as the inclination direction of the inclined surface 32, and thus the height of a peak portion 23 is constant in the longitudinal direction of the peak portion 23. The edge portion 11b is disposed at a constant height position on the inclined surface 32 of the base plate 30, and is placed on the peak portion 23 of the back foil piece 21 which is formed having a constant height, whereby the height of the edge portion 11b is constant. In other words, the height of the edge portion 11b is constant in the longitudinal direction thereof. That is, the edge portion 11b is positioned so that the height of the edge portion 11b becomes the greatest in the top foil piece 11, and thus the edge portion 11b is disposed so as to be the closest to the thrust collar 4 at the time of non-rotation of the thrust collar 4.

Next, the operation of the thrust bearing 3A(3) having the above configuration is described.

When the rotary shaft 1 rotates at a high speed, an air film (fluid lubrication film) is formed through the wedge effect, between the thrust collar 4 and the top foil piece 11 (the top foil 10) which is the bearing surface of the thrust bearing 3A(3). The top foil piece 11 is disposed on the inclined surface 32 formed in the support area 31, through the back foil piece 21 in which the heights of the peak portions 23 are formed to be constant. Therefore, the height of the top foil piece 11 gradually increases from the edge portion 11a to the edge portion 11b along the inclination of the inclined surface 32.

Thus, the gap between the thrust collar 4 and the top foil piece 11 gradually narrows from the edge portion 11a to the edge portion 11b which is on the trailing side of the edge portion 11a in the rotational direction of the thrust collar 4. Therefore, a pressure occurs at, in particular, the edge portion 11b through the wedge effect, and an air film (fluid lubrication film) is formed. The air film is formed through the wedge effect in this way, and thus the thrust bearing 3A(3) stably supports a load (the thrust collar 4).

In the thrust bearing 3A(3) of this embodiment, the inclined surface 32 whose height increases in the rotational direction of the thrust collar 4 is formed in each support area 31 of the base plate 30 supporting the back foil piece 21 (bump foil piece). The top foil piece 11 is disposed on the inclined surface 32 through the back foil piece 21, and thereby the height of the top foil piece 11 can be accurately changed along the inclined surface 32. In addition, in this case, it is sufficient that the back foil piece 21 is manufactured so that the heights of the peak portions 23 are constant without changing the heights, and thus the machining cost thereof can be limited.

Consequently, in the thrust bearing 3A(3), the machining thereof becomes easy, the mass productivity is improved, and the reduction of the production cost thereof can be achieved. In addition, the machining becomes easy, variations in the manufacturing are decreased, and therefore the bearing load capability can be accurately designed beforehand.

Since the inclined surface 32 is inclined in a direction orthogonal to the boundary line 31a which is formed in the radial direction of the base plate 30, the machining of the inclined surface 32 can be easily performed. In addition, the machining of the back foil piece 21 (bump foil piece) can also be easily performed in accordance with the shape of the inclined surface 32. In a case where an inclined surface is formed so that the height of the inclined surface gradually increases in the circumferential direction of the base plate 30, the inclined surface has a curved surface rather than a flat surface, and the machining thereof becomes difficult. When a bump foil piece is formed in accordance with the inclined surface having such a curved surface, peak portions and valley portions are not formed so as to be parallel to each other, but have to be formed so that the intervals thereof are narrow on the inner circumferential-side of the base plate 30 and are wide on the outer circumferential-side of the base plate 30, and thus the machining of the bump foil piece also becomes difficult. In contrast, in this embodiment, the inclined surface 32 has a flat surface, it is sufficient that peak portions and valley portions of a bump foil piece be formed at the same intervals so that the peak portions and the valley portions are parallel to each other, and therefore the machining thereof becomes easy.

In addition, in the present invention, an inclined surface may be formed so that the height thereof gradually increases in the circumferential direction of the base plate 30, and a bump foil piece may be formed so that the intervals of peak portions or of valley portions of the bump foil piece are narrow on the inner circumferential-side of the base plate 30 and are wide on the outer circumferential-side of the base plate 30. Even in this case, since the inclined surface 32 is formed in the base plate 30, the machining need not be performed in which the height of each peak portion of a bump foil (a bump foil piece) is changed. Therefore, the machining thereof becomes easier than that in the related art, and the machining cost thereof can be limited.

Since the height of the edge portion 11b on the trailing side of the top foil piece 11 in the rotational direction of the thrust collar 4 is formed to be constant, the pressure generated through the wedge effect can be further increased, and thus the bearing load capability can be further improved. That is, since the portion having the greatest height within the top foil piece 11 (the portion at which the gap between the portion and the thrust collar 4 is the narrowest), which generates the highest pressure through the wedge effect, is set to be the whole edge portion 11b (the range spanning the radial direction of the base plate 30), the generated pressure can be further increased compared to, for example, a case where a portion of the edge portion 11b has a greater height than that of the other portion of the edge portion 11b.

Since the top foil piece 11 is fixed to the base plate 30 through the edge portion 11a positioned on the leading side of the top foil piece 11 in the rotational direction of the thrust collar 4, the edge portion 11b on the trailing side thereof in the rotational direction of the thrust collar 4 is set to a state of being separated from the base plate 30 via the back foil piece 21 (the back foil 20), and the gap between the edge portion 11b and the thrust collar 4 becomes narrow. Thus, as described above, the favorable wedge effect can be obtained at the edge portion 11b.

Since the back foil piece 21 is disposed so that the arrangement direction of the peak portions 23 and the valley portions 22 of the back foil piece 21 is the same as the inclination direction of the inclined surface 32, the height of the top foil piece 11 can be changed in accordance with the inclined surface 32 of the base plate 30 by forming the heights of the peak portions 23 to be the same as each other. Thus, it is sufficient that the back foil piece 21 be formed so that the heights of the peak portions 23 thereof are the same as each other, and therefore the machining of the back foil piece 21 can become easy.

Since the edge portion 21a on the trailing side of the back foil piece 21 in the rotational direction of the thrust collar 4 is fixed to the base plate 30, the back foil piece 21 can be fixed to the base plate 30 using, for example, spot welding in the formation direction (the radial direction of the base plate 30) of the valley portion 22 of the back foil piece 21, and thus the fixing of the back foil piece 21 can be easily performed.

In the thrust bearing 3, the peak portions 23 of the back foil piece 21 (bump foil piece) are expanded in a direction along the inclined surface 32 by receiving a load added from the top foil piece 11, and each peak portion 23 slides in the direction, thereby obtaining a flexible spring characteristic. At this time, if the slide of the peak portion 23 (or of the valley portion 22) is restricted by, for example, resistance of the inclined surface 32, it becomes difficult to properly slide the peak portion 23, and the spring constant of the bearing may be greatly increased. In this case, the top foil cannot appropriately accept a change of a fluid lubrication film formed having a thickness of several micrometers, the fluid lubrication film may be broken due to an impact or the like, and the thrust collar and the top foil may contact each other. The proper operation of the bearing may be disturbed due to the contact.

The inclined surface 32 of this embodiment is formed continuously from the boundary line 31b to the boundary line 31a, and neither a recessed portion, a projecting portion nor the like, in which the inclination angle thereof suddenly changes, is provided within the inclined surface. In addition, the back foil piece 21 is disposed within the inclined surface 32 having this structure. Therefore, the resistance of the inclined surface 32 to the slide of the peak portion 23 when receiving a load from the top foil piece 11 can be decreased, and the peak portion 23 can flexibly slide even when receiving a small load. Thus, it is possible to prevent the spring constant of the bearing from greatly increasing, the top foil piece 11 can appropriately accept a change of the fluid lubrication film, and the preferable fluid lubrication film can be properly maintained. That is, the proper operation of the bearing can be maintained.

(Second Embodiment)

Next, a second embodiment of the thrust bearing 3 of the present invention is described.

Figure 4A:
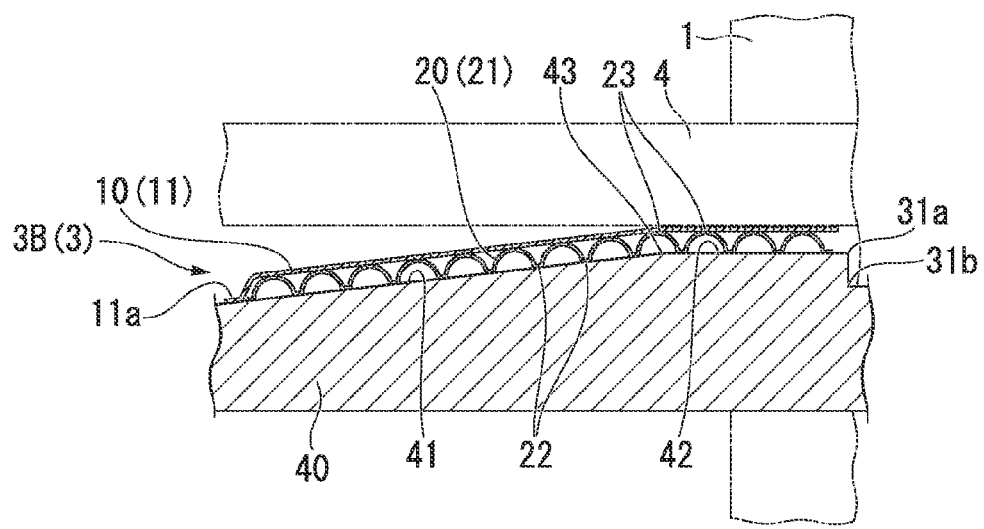
FIG. 4A is a cross-sectional side view of a main section of a thrust bearing of a second embodiment of the present invention.
Figure 4B:
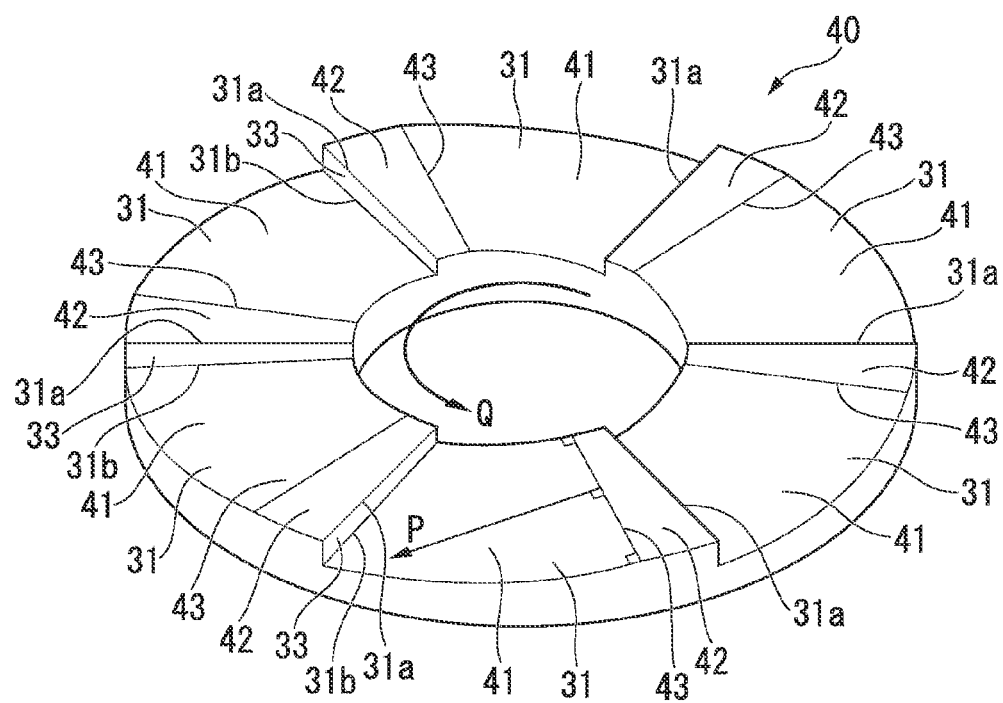
FIG. 4B is a perspective view of a base plate in the thrust bearing of the second embodiment of the present invention.

The main difference of a thrust bearing 3B(3) of the second embodiment from the thrust bearing 3A(3) of the first embodiment is that as shown in FIGS. 4A and 4B, inclined surfaces and level surfaces are formed in a base plate 40. In addition, FIG. 4A is a cross-sectional side view of the thrust bearing 3B(3) at the position corresponding to FIG. 2B, and FIG. 4B is a perspective view of the base plate 40.

As shown in FIG. 4B, the base plate 40 of this embodiment includes six support areas 31 similarly to the base plate 30 of the first embodiment, and an inclined surface 41 whose height increases in the rotational direction of a thrust collar 4 (a rotary shaft 1) is formed in each support area 31. In this embodiment, a boundary line 31a positioned between support areas 31 next to each other is also formed in the radial direction of the base plate 40. In addition, in the first embodiment, the inclined surface 32 is formed in the whole of the support area 31, but in contrast, in this embodiment, the inclined surface 41 is formed only in a portion of the support area 31, namely in a portion on the leading side of the support area 31 in the rotational direction of the thrust collar 4 (in a position near the boundary line 31b). Furthermore, a level surface 42 is formed in a portion on the trailing side of the support area 31 in the rotational direction of the thrust collar 4 (in a portion on the advancing side thereof in the rotational direction, in a position near the boundary line 31a). That is, the inclined surface 41 and the level surface 42 are formed in each support area 31 of this embodiment.

As shown in FIG. 4A, the level surface 42 is a flat surface continuing from the highest position of the inclined surface 41 (the end part on the advancing side of the inclined surface 41 in the rotational direction of the thrust collar 4) to the boundary line 31a positioned on the trailing side of the highest position in the rotational direction of the thrust collar 4 (the rotary shaft 1), and is a surface parallel to the back surface of the base plate 40 unlike the inclined surface 41. That is, the level surface 42 is a surface which is formed so as to be arranged to be parallel to the outer surface (the surface perpendicular to the rotation axis of the rotary shaft 1) of the thrust collar 4. Thus, the level surface 42 is also arranged to be perpendicular to the axial direction of the rotary shaft 1. As shown in FIG. 4B, a boundary line 43 (second boundary line) positioned between the inclined surface 41 and the level surface 42 is formed in the radial direction of the base plate 40. In addition, the boundary line 43 of this embodiment is provided on a radial line (or on the vicinity of the radial line) passing through the center of the base plate 40, but the present invention is not limited to this structure, and the boundary line 43 may be provided at a position separated from the radial line.

In addition, the inclined surface 41 is inclined so that the height of the inclined surface 41 gradually decreases in a direction orthogonal to the boundary line 43 (refer to the arrow mark P in FIG. 4B). Thus, in this embodiment, a step is also formed at the position in which each boundary line 31a is formed, namely at the position between one support area 31 and another support area 31 next to the one support area 31 across the boundary line 31a.

The inclined surface 41 is inclined in a direction orthogonal to the boundary line 43. Accordingly, when a straight line is imagined which is at any position within the inclined surface 41 and which is parallel to the boundary line 43, the height of the straight line is constant in the longitudinal direction of the straight line.

The inclined surface 41 is defined by the boundary line 31b and by the boundary line 43, and is formed so that the height of the inclined surface 41 gradually increases from the boundary line 31b to the boundary line 43. In addition, the inclined surface 41 is formed continuously from the boundary line 31b to the boundary line 43, and neither a recessed portion, a projecting portion nor the like, in which the inclination angle thereof suddenly changes, is provided within the inclined surface. The inclined surface 41 of this embodiment is formed having a constant inclination angle in the range from the boundary line 31b to the boundary line 43. In addition, the inclined surface 41 may be inclined so that the whole inclined surface 41 is slightly curved in a concave shape or in a convex shape in the range from the boundary line 31b to the boundary line 43 when viewed in the radial direction of the base plate 40.

The boundary line 43 is positioned in a plane perpendicular to the central axis of the rotary shaft 1. That is, the height of the boundary line 43 (the height thereof in the central axis direction) is set to be constant in the longitudinal direction of the boundary line 43.

The inclined surface 41 of this embodiment is formed in an approximately trapezoidal shape in which a pair of radial lines connect an inner circumferential-side arc and an outer circumferential-side arc which is longer than the inner circumferential-side arc. In the connection part between the inner circumferential-side arc and the boundary line 43 in the inclined surface 41, the tangential line of the inner circumferential-side arc and the boundary line 43 are approximately orthogonal to each other. Similarly, in the connection part between the outer circumferential-side arc and the boundary line 43 in the inclined surface 41, the tangential line of the outer circumferential-side arc and the boundary line 43 are approximately orthogonal to each other.

In the thrust bearing 3 of this embodiment, the level surface 42 is formed to be next to the trailing side of the inclined surface 41 of the support area 31 in the rotational direction of the thrust collar 4. That is, since the level surface 42 is formed so as to be connected to the part of the inclined surface 41 having the greatest height, as shown in FIG. 4A, the portion of a top foil piece 11, which becomes the highest at, in particular, the time of rotation of the thrust collar 4, has a comparatively large area corresponding to the area of the level surface 42.

Thus, in a period before an air film (fluid lubrication film) is formed in the beginning of rotation of the thrust collar 4 (the rotary shaft 1), it is possible to prevent only a part of the top foil piece 11 from contacting the thrust collar 4 and from being damaged. In addition, since an area, in which the peak load (the greatest load) occurs, is set to be large, the peak load can be decreased, and the total load capability of the thrust bearing 3 can be improved.

Furthermore, since the range of the inclined surface 41 is less than that of the first embodiment, the machining thereof can be easily performed.

Figure 4C:
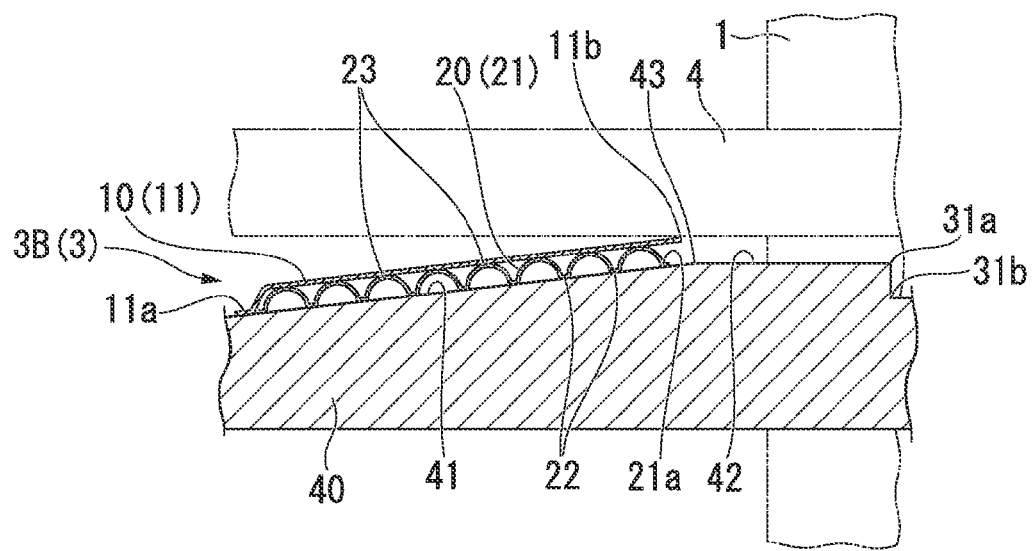
FIG. 4C is a cross-sectional side view of a main section of a modification of the thrust bearing of the second embodiment of the present invention.

In the second embodiment, a modification described below can be considered. FIG. 4C is a cross-sectional side view of a main section of a modification of the thrust bearing of the second embodiment of the present invention. FIG. 4C is a cross-sectional side view of the modification at the position corresponding to FIG. 2B (to FIG. 4A).

A back foil piece 21 of this modification is disposed within the inclined surface 41. A top foil piece 11 is formed to be slightly larger than the back foil piece 21 in plan view, and is disposed so as to cover the back foil piece 21.

As described above, the inclined surface 41 of this embodiment is formed continuously from the boundary line 31b to the boundary line 43, and neither a recessed portion, a projecting portion nor the like, in which the inclination angle thereof suddenly changes, is provided within the inclined surface. Since the back foil piece 21 is disposed within the inclined surface 41 having this structure, the resistance of the inclined surface 41 to the slide of the peak portion 23 when receiving a load from the top foil piece 11 can be decreased, and the peak portion 23 can flexibly slide even when receiving a small load. Thus, it is possible to prevent the spring constant of the bearing from greatly increasing, the top foil piece 11 can properly accept a change of the fluid lubrication film, and the preferable fluid lubrication film can be properly maintained. That is, the proper operation of the bearing can be maintained.

In addition, the edge portion 11a of this embodiment and of this modification is fixed to the vicinity of the boundary line 31b whose height is the least within the inclined surface 41 (refer to FIGS. 4A to 4C). The fixing of the edge portion 11a to the base plate 40 can be performed through spot welding or through a general mechanical fixing method such as screw fixing. In addition, the edge portion 11 a of the top foil piece 11 disposed in one support area 31 may be fixed to the vicinity of the boundary line 31a in the level surface 42 of another support area 31 next to the one support area 31.

(Third Embodiment)

Next, a third embodiment of the thrust bearing 3 of the present invention is described.

Figure 5A:
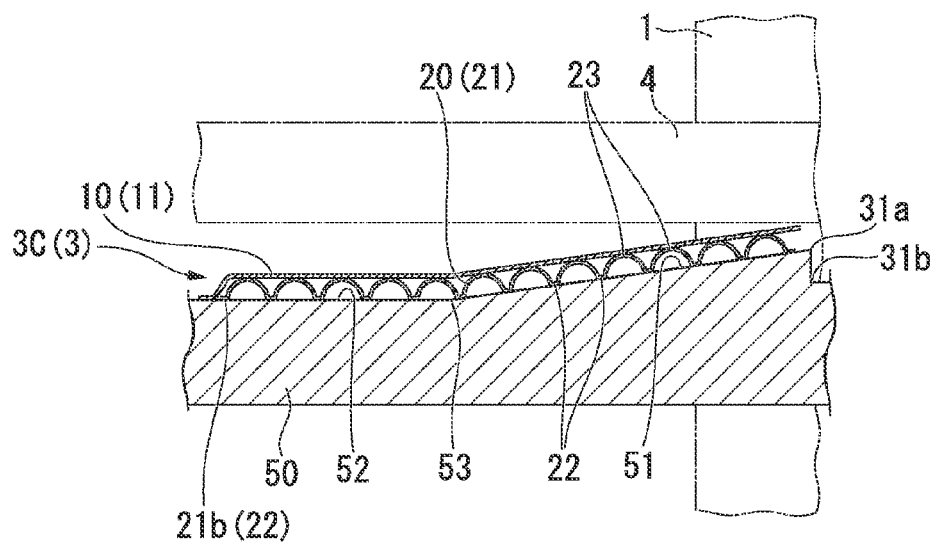
FIG. 5A is a cross-sectional side view of a main section of a thrust bearing of a third embodiment of the present invention.
Figure 5B:
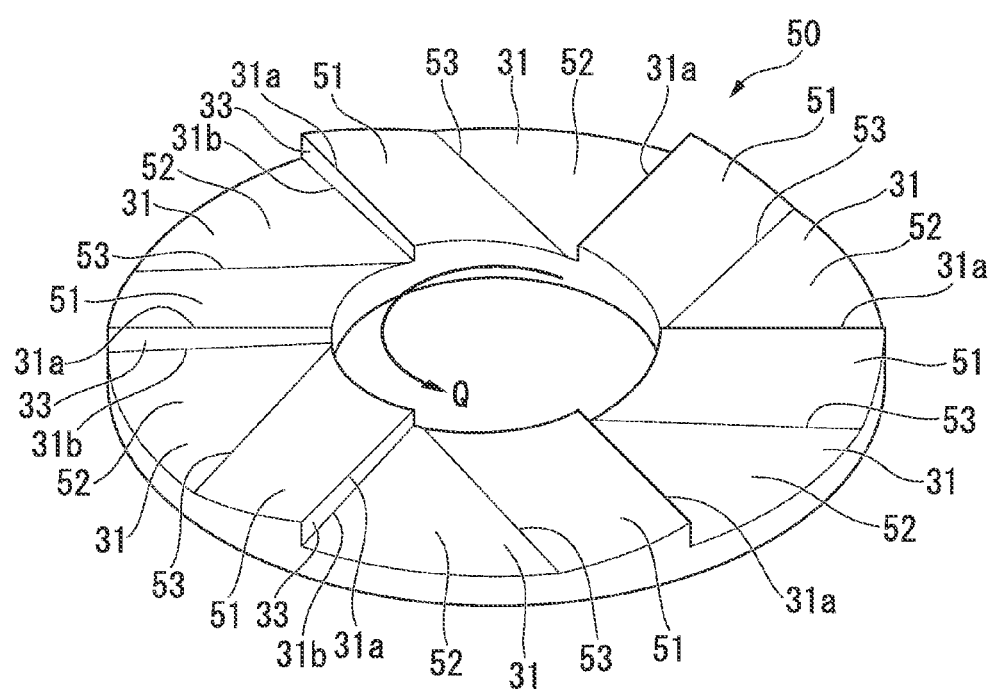
FIG. 5B is a perspective view of a base plate in the thrust bearing of the third embodiment of the present invention.

A difference of a thrust bearing 3C(3) of the third embodiment from the thrust bearing 3B(3) of the second embodiment is that as shown in FIGS. 5A and 5B, the positional relationship between a level surface and an inclined surface which are formed in a base plate 50 is the reverse of the positional relationship of the second embodiment in the circumferential direction of the base plate 50. In addition, FIG. 5A is a cross-sectional side view of the thrust bearing 3C(3) at the position corresponding to FIG. 2B, and FIG. 5B is a perspective view of the base plate 50.

As shown in FIG. 5B, the base plate 50 of this embodiment includes six support areas 31 similarly to the base plate 30 of the first embodiment, and an inclined surface 51 whose height increases in the rotational direction of a thrust collar 4 (a rotary shaft 1) is formed in each support area 31. In this embodiment, a boundary line 31a positioned between support areas 31 next to each other is also formed in the radial direction of the base plate 50. In the first embodiment, the inclined surface 32 is formed in the whole of the support area 31, but in contrast, in this embodiment, the inclined surface 51 is formed only in a portion of the support area 31, namely in a portion on the trailing side (on the advancing side) of the support area 31 in the rotational direction of the thrust collar 4. In addition, a level surface 52 is formed in a portion on the leading side of the support area 31 in the rotational direction of the thrust collar 4.

As shown in FIG. 5A, the level surface 52 is a flat surface continuing from the lowest position of the inclined surface 51 to the boundary line 31b positioned on the leading side of the lowest position in the rotational direction of the thrust collar 4 (the rotary shaft 1), and is a surface parallel to the back surface of the base plate 50 similarly to the level surface 42 of the second embodiment. That is, the level surface 52 is a surface which is formed so as to be arranged to be parallel to the outer surface (the surface perpendicular to the central axis of the rotary shaft 1) of the thrust collar 4. As shown in FIG. 5B, a boundary line 53 positioned between the inclined surface 51 and the level surface 52 is formed to be parallel to the boundary line 31a. In addition, the inclined surface 51 is inclined so that the height of the inclined surface 51 gradually decreases in a direction orthogonal to the boundary line 31a similarly to the first embodiment. Thus, in this embodiment, a step is also formed at the portion in which each boundary line 31a is formed, namely at the position between one support area 31 and another support area 31 next to the one support area 31 across the boundary line 31a.

In the thrust bearing 3 of this embodiment, since the level surface 52 is formed so as to be connected to the leading side of the inclined surface 51 of the support area 31 in the rotational direction of the thrust collar 4, the range of the inclined surface 51 is less than that of the first embodiment, and thus the machining thereof can become easy.

In addition, in this embodiment, the valley portion 22, which is the edge portion on the leading side of a back foil piece 21 in the rotational direction of the thrust collar 4, may be formed to be parallel to, for example, the boundary line 53, and thereby the valley portion 22 not of the edge portion on the trailing side but of the edge portion 21b on the leading side of the back foil piece 21 in the rotational direction of the thrust collar 4 may be fixed onto the level surface 52. In this case, the back foil piece 21 can be fixed to the base plate 50 through, for example, spot welding in the formation direction of the valley portion 22 of the back foil piece 21, and the fixing of the back foil piece 21 can be easily performed.

Additionally, in the above way, the fixing portion of the back foil piece 21 and the fixing portion of the top foil piece 11 can be fixed onto the leading side of the level surface 52 in the rotational direction of the thrust collar 4 so as to be close to each other, and thus the back foil piece 21 and the top foil piece 11 can be accurately arranged so that the relative positional relationship therebetween is equivalent to the designed positional relationship thereof.

Hereinbefore, the preferable embodiments of the present invention have been described with reference to the attached drawings, but the present invention is not limited to the embodiments. That is, the shape, the combination or the like of each component shown in the above embodiments is an example, and additions, omissions, replacements, and other modifications of configurations based on design requests or the like can be adopted within the scope of and not departing from the gist of the present invention.

For example, in the above embodiments, six support areas are formed in a base plate, and a back foil piece (bump foil piece) and a top foil piece are disposed on each support area. However, a plurality of support areas may be formed in a base plate, and the number of the support areas may be 5 or less, or may be 7 or more. In this case, the number of back foil pieces (bump foil pieces) or of top foil pieces is changed in accordance with the number of the support areas.

In a case where a level surface is formed in a support area of a base plate, level surfaces may be formed on both sides of an inclined surface in the circumferential direction of the thrust collar 4, instead of that a level surface is formed on only one side of an inclined surface as in the second or third embodiment.

Furthermore, it is possible to adopt various configurations other than the above embodiments, for example, with respect to arrangement of a top foil piece or of a back foil piece (bump foil piece) on a support area, the inclination direction of an inclined surface, the longitudinal direction of a boundary line positioned between support areas, and the longitudinal direction of a boundary line positioned between a level surface and an inclined surface.

DESCRIPTION OF REFERENCE SIGNS 1 rotary shaft
3, 3A, 3B, 3C thrust bearing
4 thrust collar
10 top foil
11 top foil piece
11a edge portion
20 back foil
21 back foil piece (bump foil piece)
22 valley portion
23 peak portion
30 base plate
31 support area
31a boundary line (second boundary line)
31b boundary line (first boundary line)
32 inclined surface
40 base plate
41 inclined surface
42 level surface
43 boundary line (second boundary line)
50 base plate
51 inclined surface
52 level surface

The invention claimed is:

1. A thrust bearing disposed so as to face a thrust collar provided on a rotary shaft, the thrust bearing comprising:
    a top foil disposed so as to face the thrust collar;
    a back foil disposed so as to face a surface of the top foil opposite to another surface of the top foil facing the thrust collar, and supporting the top foil; and
    an annular plate-shaped base plate disposed on a side of the back foil opposite to the top foil, and supporting the back foil,
    wherein the back foil is formed of back foil pieces arranged in a circumferential direction of the base plate,
    the top foil is formed of top foil pieces disposed on the back foil pieces,
    the base plate includes support areas which support the back foil pieces and which are arranged in the circumferential direction,
    at least one of the support areas includes an inclined surface defined by a first boundary line and by a second boundary line disposed on a trailing side of the first boundary line in a rotational direction of the thrust collar,
    the inclined surface has a height which gradually increases from the first boundary line to the second boundary line, and is formed continuously from the first boundary line to the second boundary line, and
    at least one of the back foil pieces is disposed within the inclined surface.

2. The thrust bearing according to claim 1, wherein the second boundary line is formed in a radial direction of the base plate, and
    the inclined surface is inclined in a direction orthogonal to the second boundary line.

3. The thrust bearing according to claim 1, wherein an edge portion on a trailing side of at least one of the top foil pieces in the rotational direction of the thrust collar is formed having a constant height.

4. The thrust bearing according to claim 1, wherein an edge portion on a leading side of at least one of the top foil pieces in the rotational direction of the thrust collar is fixed to the base plate.

5. The thrust bearing according to claim 1, wherein the one of the back foil pieces is formed in a wave sheet shape in which peak portions and valley portions are alternately arranged.

6. The thrust bearing according to claim 5, wherein the one of the back foil pieces is disposed so that an arrangement direction of the peak portions is the same as an inclination direction of the inclined surface.

7. The thrust bearing according to claim 6, wherein an edge portion on a trailing side of the one of the back foil pieces in the rotational direction of the thrust collar is fixed to the base plate.

\* \* \* \* \*